United States Patent [19]

Tange et al.

[11] Patent Number: 5,030,814

[45] Date of Patent: Jul. 9, 1991

[54] INDIRECT SPOT WELDING METHOD

[75] Inventors: Toshiyuki Tange; Hideyuki Etoh, both of Kobe; Tsuneo Kinoshita, Takasago; Susumu Kitamura, Kobe; Kozo Shida, Miki, all of Japan

[73] Assignee: Kawasaki Jukogyo Kabushiki Kaisha, Kobe, Japan

[21] Appl. No.: 509,289

[22] Filed: Apr. 13, 1990

[30] Foreign Application Priority Data

Apr. 14, 1989 [JP] Japan .................................. 1-95927

[51] Int. Cl.⁵ ............................................ B23K 11/10
[52] U.S. Cl. .................................. 219/111; 219/86.9
[58] Field of Search .................... 219/86.9, 111, 108, 219/117.1

[56] References Cited

U.S. PATENT DOCUMENTS 2,826,674  3/1958  Peras ................................... 219/111
3,317,703  5/1967  Gilbert ................................ 219/111

FOREIGN PATENT DOCUMENTS

B262-2917  1/1987  Japan .

OTHER PUBLICATIONS

S. Hohjin et al., Welding Manual, 2-28-66, pp. 418 to 421.
M. Hamasaki, Lap Resistance Welding, 8-15-71, pp. 160, 161, 226 and 227.
K. Matsuyama, Welding Technique ISSN 0387-0197, 3-1-85, pp. 28 to 32 and 98.

Primary Examiner—Clifford C. Shaw
Attorney, Agent, or Firm—Marshall, O'Toole, Gertein, Murray & Bicknell

[57] ABSTRACT

A method of indirect spot welding two or more members together, comprising the steps of pressing electrodes against at least one of the members, flowing a square wave current between the electrodes and across the members during a first time period, pausing the flow of current, flowing a square wave current between the electrodes and across the members during a second time period, and stopping the flow of current.

6 Claims, 5 Drawing Sheets

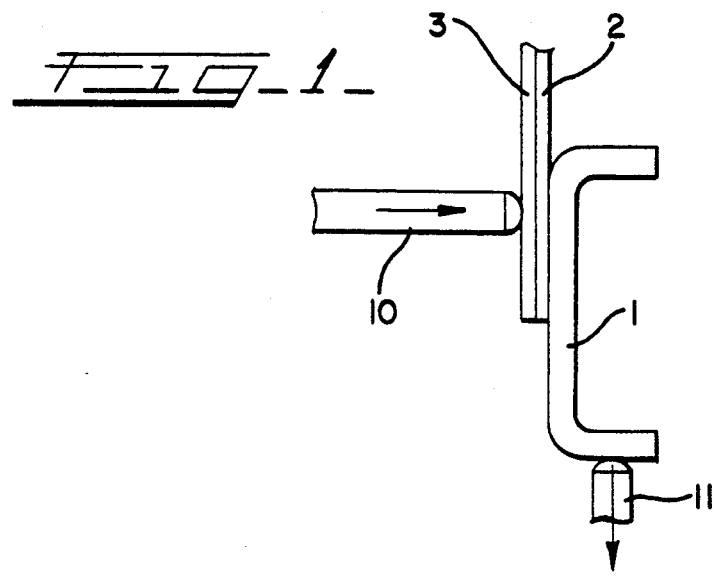
FIG-1-
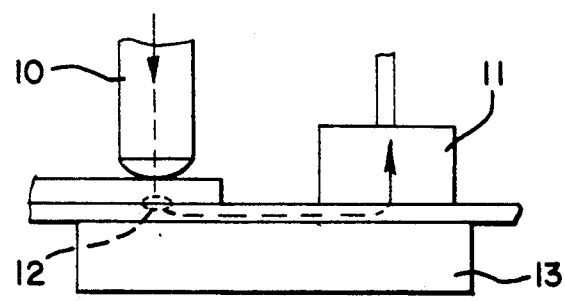
FIG-2-
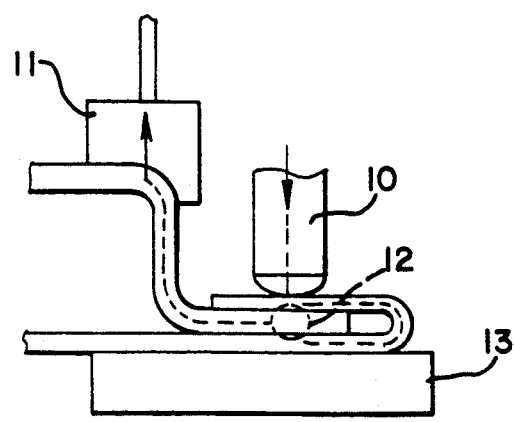
FIG-3-

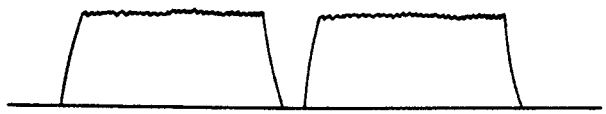
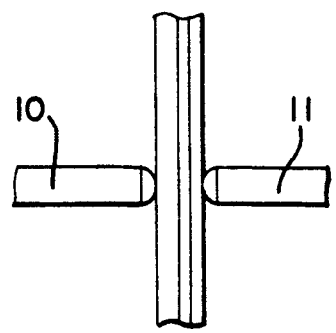
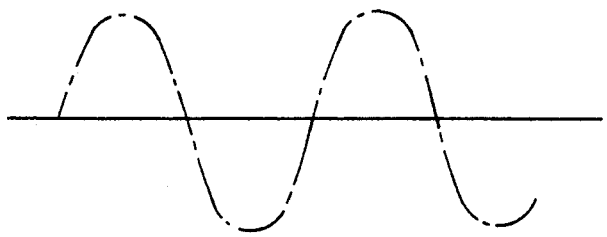
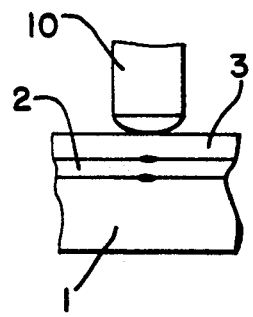 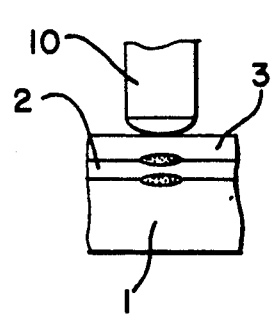 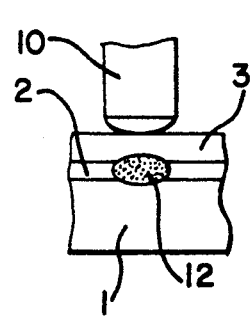
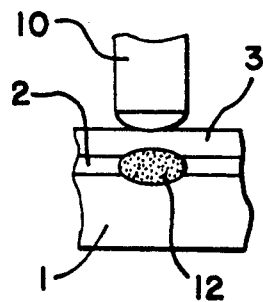 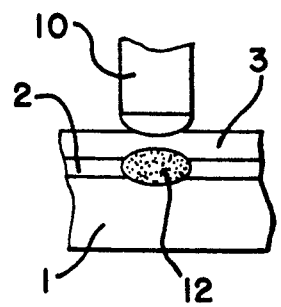

FIG-6-
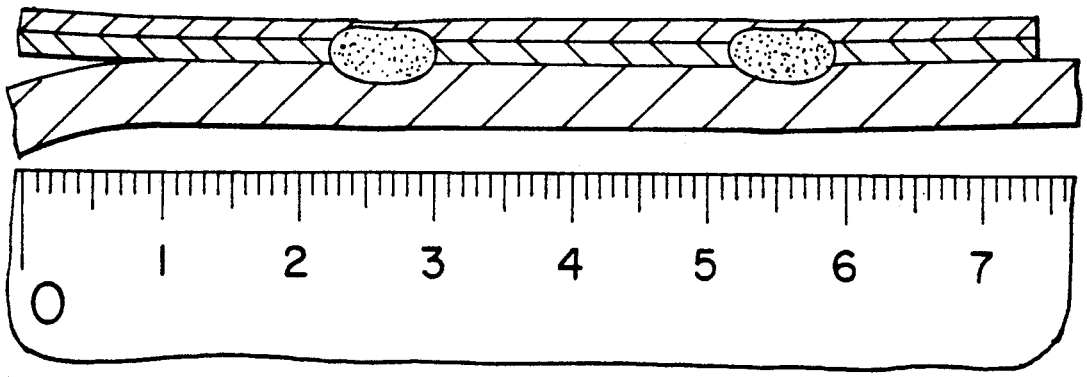
FIG-7-
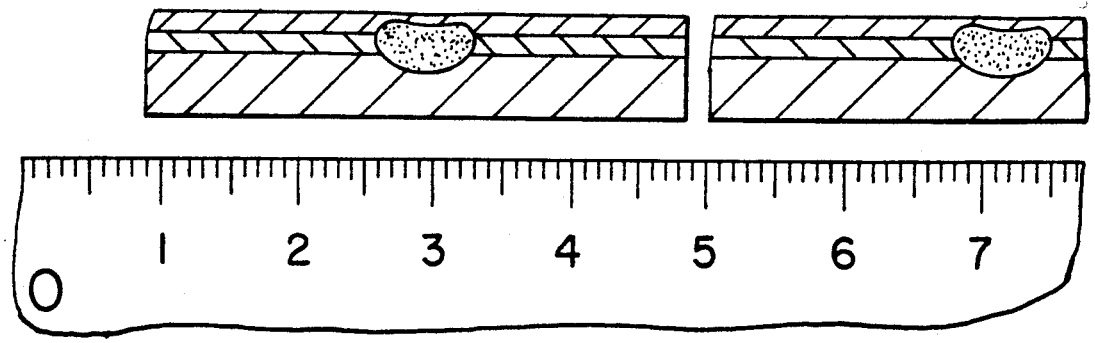

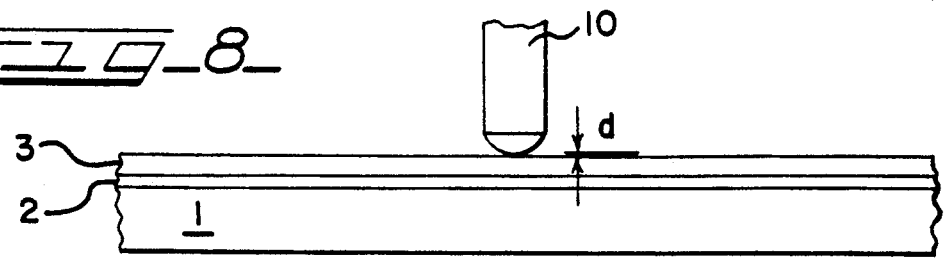
FIG_8_
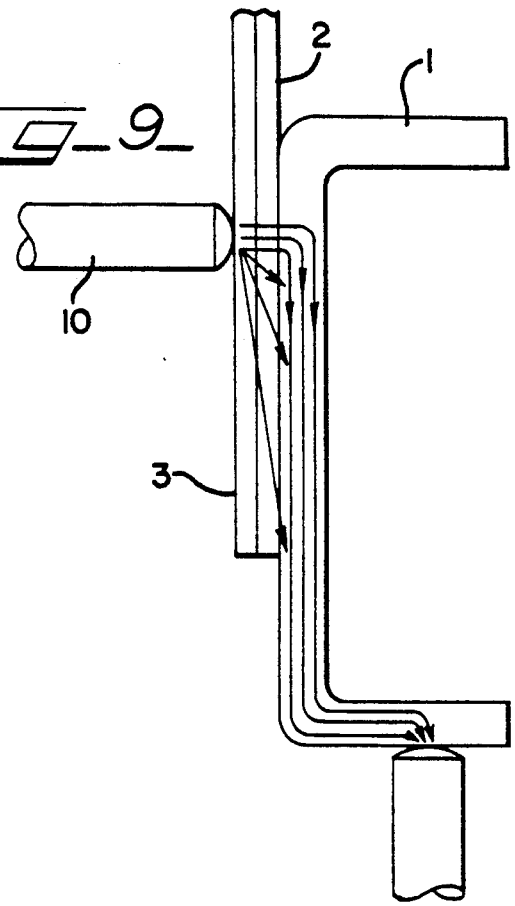
FIG_9_
FIG_10_
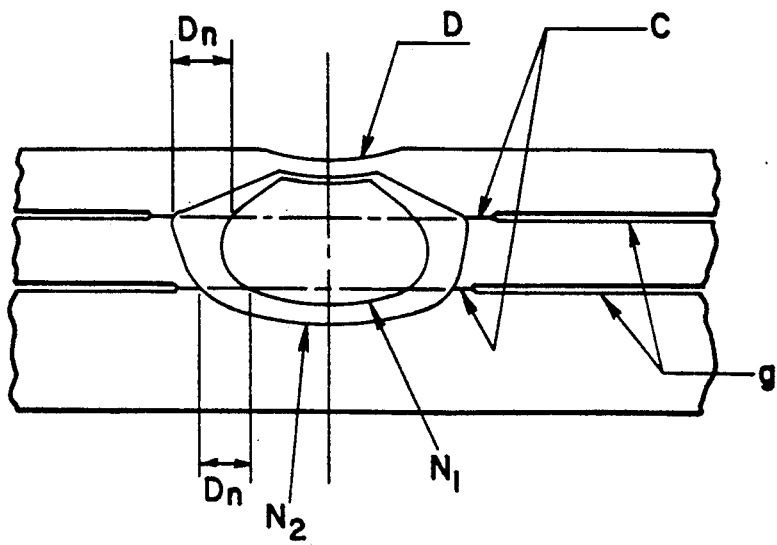

Fig. 11

| NUMBER OF PANELS | COMBINATION OF MEMBERS BEING WELDED | | | ELECTRODE | | | | 1ST CURRENT FLOW | | | 2ND CURRENT FLOW | | SQUEEZE TIME |
|---|---|---|---|---|---|---|---|---|---|---|---|---|---|
| | POSITION | MATERIAL (5 US 3 OIL) | THICKNESS | TIP'S RADIUS OF CURVATURE | MATERIAL | DIAMETER | ELECTRODE FORCE | CURRENT | WELD TIME | COOL TIME | CURRENT | WELD TIME / HOLD | |
| 1  3 | UPPER MIDDLE LOWER | HT HT HT | 3 1.5 6 | 75mm | CHROMIUM-COPPER ALLOY | 20mm | 1160 kgf | 12500 A | 40/60s | 3/60s | 12500 A | 40/60s / 90/60s | 90/60s |
| 2  3 | UPPER MIDDLE LOWER | MT MT HT | 3 1.5 6 | 75mm | | 20mm | 1160 kgf | 12500 A | 40/60s | 3/60s | 12500 A | 40/60s / 90/60s | 90/60s |
| 3  3 | UPPER MIDDLE LOWER | DLT HT HT | 1.5 1.5 3 | 75mm | | 20mm | 400 kgf | 7600 A | 50/60s | 3-10/60s | 7600 A | 99/60s / 90/60s | 90/60s |
| 4  3 | UPPER MIDDLE LOWER | DLT HT HT | 1.5 1.5 3 | 75mm | | 20mm | 390 kgf | 8100 A | 50/60s | 3-10/60s | 8100 A | 99/60s / 90/60s | 90/60s |
| 5  3 | UPPER MIDDLE LOWER | DLT HT HT | 1.5 1.5 4.5 | 200mm | | 20mm | 400 kgf | 7400 A | 50/60s | 3-10/60s | 7400 A | 99/60s / 99/60s | 99/60s |
| 6  3 | UPPER MIDDLE LOWER | DLT HT HT | 1.5 1.5 4.5 | 200mm | | 20mm | 380 kgf | 8500 A | 70/60s | 10/60s | 8500 A | 50/60s / 90/60s | 90/60s |
| 7  3 | UPPER MIDDLE LOWER | DLT HT HT | 1.5 1.5 4.5 | 200mm | | 20mm | 400 kgf | 7400 A | 50/60s | 10/60s | 7400 A | 99/60s / 99/60s | 90/60s |

INDIRECT SPOT WELDING METHOD

Field and Background of the Invention

This invention relates to a method for spot welding in structures which are assembled either by welding relatively thin panel-shaped members to each other, or by welding thin panel-shaped members to a structural member having a relatively high rigidity.

For example, in structures including stainless steel plate, from the viewpoints of workability and appearance, it is more common to use spot welding rather than conventional arc welding methods to attach the thin panels to a frame or other structural member or to other panel members which form the internal layer of the structure.

In order to securely spot weld outer panels to a structure such as a frame or a thick panel, it is necessary to use a relatively high electrical current; for example, a current of approximately 13,500 A is used to weld outer panels having a thickness of 1.5 mm to a panel member having a thickness of 6 mm. Also, when doing this, in order to ensure good contact between the electrodes and the panels and between the panels themselves, it is necessary to press the electrodes against the panels at a pressure which corresponds to the current just mentioned, such as a pressure of approximately 1,300 kgf (kilogram-force) for the above example.

In this case, if the panel is supported at the internal layer by a structural member having a high rigidity, the spot welding can be executed with no problem either by the "direct method" which will be subsequently explained, or by the so-called "indirect method" shown in FIGS. 1 through 3 herein, in which the welding electrode 10 is not positioned opposite the collector electrode 11 on opposing sides of the members being welded.

In addition, even when welding panels to a relatively thin internal layer panel, with the direct welding method shown in the example in FIG. 12 herein, in which the collector electrode 11 is positioned on the opposite side of the members being welded from the welding electrode 10, because the panels are pressed from opposite sides, there is no movement in the direction of the pressing force when the electrodes are pressed against the panels. As a result, just as in the case described above, it is possible to execute the welding at the optimum pressing force and the optimum current.

However, when using the indirect method to spot weld panels to a structural member having a low rigidity, such as to a panel having a thickness of approximately 6 to 8 mm, because the panels and the internal layer structural member will be deformed when the electrodes are pressed against them, the electrodes can only be pressed against the panels at a pressure within the deformation limit, such as 1,100 kgf for a panel having a thickness of 6 mm.

If welding is executed at a high current while the pressing force is low, the metal which is melted between the electrodes and the members being welded will splatter. Not only will this adversely affect the external appearance of the welding location, but it will also lead to a reduction of the welding strength.

Thus, the welding current is limited by the pressing force, and this also determines the welding performance and affects the reliability of the weld.

For this reason, the welding of panels in locations where reliability is required has been done exclusively by the direct method, in which the pressure can be increased.

However, with the direct method, the electrodes must be positioned so that they oppose each other on opposite sides of the members being welded, and thus this method is limited to welding in locations which have sufficient space for the insertion of the electrodes.

On the other hand, for the execution of the indirect method, it has been necessary to devise some means of supporting the members being welded, such as in a jig.

SUMMARY OF THE INVENTION

In view of the foregoing problems, it is a general object of this invention to provide an improved indirect spot welding method capable of being used even for the welding of members consisting of thin panels.

A method of indirect spot welding two or more members together comprises the steps of:

a) pressing electrodes against at least one of the members;

b) flowing a square wave current between the electrodes and across the members during a first time period;

c) pausing the flow of current;

d) flowing a square wave current between the electrodes and across the members during a second time period; and e) stopping the flow of current.

This method uses a power supply in which the welding current is a square wave. With an alternating-current welding power supply of the prior art, because the welding current indicated by the dash-dot line in FIG. 4(b) is a sine curve, the maximum current value must increase in order to obtain the necessary current. With the square-wave current according to this invention, indicated by the solid line in FIG. 4(a), because the maximum current during the flow of current can be set to the desired current value, an appropriate value can be selected for the pressing force of the electrodes, and both deformation of the members being welded and indentations in the surfaces are reduced.

Furthermore, because the flow of welding current is divided into two time periods and a time in which no current flows is provided between the flows of current, the panel is melted and deformed by the first flow of current, a contact surface area larger than that at the start of the flow of current is formed, and then the current flows smoothly from that enlarged contact surface during the second flow of current, thus avoiding damage to the welding surface at a low pressing force. In addition, because a melted nugget inside the members being welded is formed by the first flow of current and the electrical resistance of that molten part increases during the second flow of current, the current flows to the area surrounding the nugget, thus causing the inner contact location to become larger and deeper for a more secure weld.

Moreover, because, as just explained, the current flows smoothly even when the pressing force is low, the indentations in the surfaces of the members being welded are also smaller, and there is no flying about or splattering of molten material. In addition, because, as explained above, the current flow time is divided and there is a time in which no current flows, a cooling action functions, and there is less deposition of carbides on the weld even if the total current flow time is increased.

In addition to the method just described, if the current value of the first flow of current is decreased and the current value of the second flow of current is increased, because a contact surface will be formed by the flow of current with the low current value, it then becomes possible to supply current at a high current value, which in turn makes it possible to shorten the current flow time accordingly, thus resulting in a shorter overall welding time. In this case, because the current value of the first flow of current is low, the pressing force can also be reduced, thus making it possible to perform spot welding with small indentations.

The invention may be used for both direct welding (to reduce the electrode force) and indirect welding, but it is more advantageous when used for indirect welding.

BRIEF DESCRIPTION OF THE DRAWINGS

FIGS. 1 through 3 show examples of electrode positions with respect to representative welding members in the indirect welding method according to this invention;

FIGS. 4(a) and 4(b) show the electrical current waveforms in this invention and in the prior art, respectively;

FIGS. 5(a) through 5(e) are sectional views through the center of the weld nugget of the members being welded, showing the process of the formation of the molten area inside the members;

FIG. 6 a sectional view of the metal structure cut at the center of the nugget obtained using the welding method of this invention showing the condition of said nugget;

FIG. 7 is a sectional view of the metal structure cut at the center of the nugget obtained using the welding method of the prior art, showing the condition of said nugget;

FIGS. 8, 9 and 10 are sectional views which further illustrate the operation of the invention; and FIG. 11 is a table showing the pressing forces of the welding electrode, the current values, and other data which changes in accordance with the conditions of the members being welded in the indirect spot welding method of this invention; and FIG. 12 shows the positions of the electrodes with respect to the members being welded in the direct spot welding method.

DETAILED DESCRIPTION OF THE DRAWINGS

First, in order to spot weld two or more members together, the welding electrode 10 and the collector electrode 11 are positioned with respect to the members being welded as shown in one of FIGS. 1 through 3. For example, as shown in FIG. 1, if two metal panels 2 and 3 having a thickness of approximately 1.5 mm each are to be spot welded onto a member 1 having a thickness of approximately 3 mm, first the welding electrode 10 is positioned at the desired weld point on the panel 3, and then the collector electrode 11 is positioned at an appropriate location on the member 1 slightly separated from the welding electrode 10. Each electrode 10 and 11 has a tip having a radius of curvature of, for example, 75 mm. Then, the welding electrode 10 is pressed at such a force that it does not cause deformation of the member 1 or the panels 2 and 3. For example, the panels 2 and 3 and the member 1 are pressed against by the electrode 10 at a force of 400 kgf.

Next, the flow of a square-wave current such as that indicated in FIG. 4(a) is supplied for a first period of 50 cycles of a 60 Hz power supply (50/60 second), stopped for a pause period of 3 cycles (3/60 second), and then supplied again for a second period of 50 cycles (50/60 second). In this way, by providing a cooling time (3 cycles) during the pause period partway through the welding process and dividing the flow of current into two separate periods, during the first period, the inner part of the members being welded, as shown by the progress from FIG. 5(a) through FIG. 5(d), gradually melts to an extent such as that indicated by the shaded oval which represents the weld nugget 12. As a further result of this first period flow of current, as shown in FIG. 5(d), the part of the panel 3 in contact with the welding electrode 10 changes in shape to match the shape of the tip of the electrode 10, thus increasing the contact area between the electrode 10 and the panel 3.

Then, after the cooling or pause period has passed, when the second period 50-cycle flow of current is supplied, because the molten nugget part 12 has a relatively high electrical resistance, the current detours and flows around this molten part 12 and flows through the surrounding area, thus causing the area surrounding the nugget part 12 to melt further (refer to FIG. 5(e)). As a result, the nugget 12 is formed with a larger diameter and deeper fusion than that formed by a single continuous flow of current according to the prior art. In addition, because the second period flow of current is supplied while there is increased contact between the welding electrode 10 and the panel, the current flows from the electrode 10 to the members being welded more smoothly (with less resistance) than during the first period flow of current, and this increases the magnitude of the current which is permissible to flow. As a result, the amount of molten material in the members being welded also increases, which contributes to increasing the diameter and depth of the nugget 12.

In order to confirm the effectiveness of welding according to this invention, photographs were taken of welded members which were cut or sectioned through the center of the nugget 12. The result can be clearly seen by comparing FIG. 6, which shows the nuggets obtained with the welding method of this invention, with FIG. 7 which shows the nuggets obtained by welding with a single flow of current as in the prior art. Each nugget 12 shown in FIG. 6 has a larger diameter and deeper fusion than those shown in FIG. 7.

FIGS. 8, 9 and 10 illustrate and explain the operation of the invention in greater detail. In the initial pressing step with no current flowing, the feeder electrode 10 is pressed against the panel 3 so that a deflection d (FIG. 8) is caused on the surface of panel 3 due to its elastic deformation.

In the first weld time (FIGS. 5a–5d), the current density is higher immediately under the electrode 10, as shown in FIG. 9. The lines and arrows represent the current flow and current density. The electrical resistance is higher at the borders between the members 1 and 2 and between the members 2 and 3.

Two small melted nuggets (FIG. 5a) are initially formed at the surfaces between the members 1, 2 and 3 just below the electrode 10 by resistance heat generation at the borders and by very small sparks at the small gaps g (FIG. 10). The surface of panel 3 in contact with the electrode 10 is heated and softened by the current, thus making a dent or indentation D in the surface under the electrode 10.

As shown in FIGS. 5b–5d, the dent becomes deeper with continued current flow, increasing the contact surface between the electrode 10 and member 3, thus lowering the electrical resistance between them. On the other hand, the nuggets are melted and therefore have a high electrical resistance, so that the current flows mainly through annular low-resistance corona bonds c (FIG. 10) formed around the nugget(s). As a result, the small nuggets gradually grow and finally become a large nugget 12. The current also flows through the nugget 12, so that its temperature rises, its viscosity lowers and the internal pressure rises as the electrode 10 is pressed.

In the indirect spot welding, because there is no backup like the collector electrode 11 opposite the feeder electrode 10, the elastic deformation without heating in the initial pressing step, the elastic deformation and plastic deformation in the later heating steps, and the temperature rise of members 1-3 by the shunt current would all be great, so that the dent would become large. It is consequently necessary to minimize the pressing force, although expulsion and surface flash are likely to occur. The upper limit of the current value at or under which no expulsion and surface flash occur should be low. In order to obtain desired sizes of the nugget at the low limit current value, it is necessary to continuously supply a higher density of energy than the amount of heat diffused by the heat transfer in the members 1-3, and to cause an amount as large as possible of the low current to flow through the nonmelted portion. This is achieved by the square wave current supplied by using an inverter.

During the cool time between the steps of FIGS. 5d and 5e, the nugget 12 is cooled to lower the energy of the melted metal tending to burst and expand the corona bonds. The nugget 12 should not be cooled too much in order to keep the electrical resistance high. It should be cooled for such a time that its melted range does not change or is reduced.

During the second weld time (FIG. 5e), a large amount of the current flows through the nonmelted portion around the nugget 12. The cooling prevents the nugget melted by the first pulse of current from being heated too high. This prevents the pressure from rising and the viscosity from lowering. The bottom of the dent is also cooled. The members 1-3 recover their strength. The electrical resistance of the central surface layer of the dent lowers. This, while preventing the dent from being enlarged, causes the current to be supplied from the vicinity of the dent center, in order to reduce the heating range and minimize the deformation. This results in small widths of corona bonds c (nonmelted portions) upon completion of welding.

More specifically with reference to FIG. 10, the current density is increased at the portion Dn to melt it. N1 shows a nugget melted during the first weld time. N2 shows a nugget enlarged during the second weld time.

A similar effect can be obtained by dividing the weld time into three or more periods.

In this way, the indirect spot welding method of this invention is capable of forming a nugget having a larger diameter and deeper fusion than the indirect spot welding method of the prior art at the same pressing force and current value, thus making it possible to obtain more reliable spot welding results.

The same results can be obtained by spot welding methods using the electrode positions shown in FIGS. 2 and 3. In FIGS. 2 and 3, a backing member 13 is provided to prevent bending of the panels due to the pressure of the electrodes.

The table of FIG. 11 lists seven examples of the implementation of this invention; in other words, examples of the implementation data related to the thicknesses and types of materials of each of the members being welded, the radius of curvature R of the contact part of the welding electrode and the diameter of the electrode, the pressing force P of the welding electrode, the current values $A_1$ and $A_2$ of the first and second periods of flow of the current, the times $T_1$ and $T_2$ of the first and second flows of current, the pause or cooling time t with no current flow, the subsequent waiting time $T_0$ when the current flow has terminated and pressure is maintained, and the initial time when pressure is applied but before current flow is initiated. This data represents specific examples for which this invention provides excellent effectiveness which at least surpasses that obtainable by the methods of the prior art, but the scope of the invention is not limited to these examples.

From the table of FIG. 11, it can be seen that, if the members being welded are thin, all that has to be done is to increase the radius of curvature R of the welding electrode so that the depth of the indentation in the surface is reduced and to reduce the magnitude of the current value A.

Although the current values shown in the table are the same for the first and second periods of flow of current, the current value of the first period of flow of current may be set lower than the value in the table, and the current value of the second period of flow of current may be set higher than the value in the table and higher than the current value in the first period of current flow. In this method, a nugget with a smaller indentation, a larger diameter, and deeper fusion will be formed.

By using the indirect spot welding method of this invention, it is possible to obtain more reliable welding than with the indirect spot welding method of the prior art using the same electrode pressing force and current value. In this way, it is possible to use an indirect spot welding method to weld panels which could not previously be welded using such a method, and it is also possible to obtain a much greater workability, reliability, and finished quality than with welding performed by the welding method of the prior art.

The square wave current may be produced by rectifying the 60 Hz power current.

What is claimed is:

1. A method of indirect spot welding two or more members together, comprising the steps of:
   (a) pressing electrodes against at least one of the members;
   (b) flowing a first square wave current between said electrodes and across the juncture between said members during a first time period, said first square wave current being sufficient to form a molten nugget at said juncture;
   (c) pausing the flow of current;
   (d) flowing a second square wave current between said electrodes and across said members during a second time period, said second square wave current being sufficient to increase the size of said molten nugget; and
   (e) stopping the flow of current.

2. The method of claim 1, wherein said second square wave current flowing in said second time period has a higher current value than in said first time period.

3. The method of claim 1, wherein the current flowing in said first and second time periods are substantially equal in magnitude.

4. The method of claim 1, wherein the lengths of said first and second time periods are substantially the same.

5. The method of claim 1, wherein the flows of said first and second square wave currents transfer energy across said members at said nugget and accumulates heat energy around said nugget.

6. The method of claim 1, wherein said nugget has a relatively high resistance, and said currents flow around said high resistance nugget and causes said nugget to increase in size.

* * * * *